(12) United States Patent
Miller

(10) Patent No.: US 6,966,608 B1
(45) Date of Patent: Nov. 22, 2005

(54) INTEGRATED TAIL GATE TRANSPORTER

(75) Inventor: Robert Wendall Miller, Bristol, FL (US)

(73) Assignee: Capital City Country Club, Tallahassee, FL (US)

( * ) Notice: Subject to any disclaimer, the term of this patent is extended or adjusted under 35 U.S.C. 154(b) by 37 days.

(21) Appl. No.: 10/927,889

(22) Filed: Aug. 27, 2004

(51) Int. Cl.$^7$ .................................................. B60P 1/34
(52) U.S. Cl. ............................. 298/17 R; 298/178 G; 296/57
(58) Field of Search ........................... 298/17 R, 23 R, 298/23 TT, 17 SG; 296/50, 51, 56; 410/3, 410/4, 24

(56) References Cited

U.S. PATENT DOCUMENTS

| | | | | |
|---|---|---|---|---|
| 1,435,369 | A | * 11/1922 | Ash | 404/108 |
| 2,110,239 | A | * 3/1938 | Richter | 414/545 |
| 2,135,857 | A | * 11/1938 | Stahl | 414/494 |
| 2,553,156 | A | * 5/1951 | Woodward | 414/545 |
| 2,581,333 | A | * 1/1952 | Vawter | 414/539 |
| 2,590,591 | A | * 3/1952 | Winkler | 414/539 |
| 2,653,845 | A | * 9/1953 | Banjamin | 296/61 |
| 2,683,545 | A | * 7/1954 | Wood | 414/469 |
| 3,024,926 | A | 3/1962 | Nolden | |
| 3,104,910 | A | * 9/1963 | Kappen | 296/51 |
| 3,688,649 | A | 9/1972 | Hostetler | |
| 4,007,844 | A | 2/1977 | Perkins | |
| 4,068,892 | A | * 1/1978 | Welch | 298/17 R |
| 4,088,235 | A | * 5/1978 | Thacker | 414/537 |
| 4,787,809 | A | 11/1988 | Zrostlik | |
| 4,813,842 | A | 3/1989 | Morton | |
| 4,993,908 | A | * 2/1991 | Park | 414/472 |
| 5,176,486 | A | * 1/1993 | Park | 414/472 |
| 5,641,262 | A | 6/1997 | Dunlop et al. | |
| 6,244,637 | B1 | * 6/2001 | Leonhardt et al. | 293/102 |
| 6,354,788 | B1 | * 3/2002 | Adams | 414/537 |
| 2004/0207226 | A1 | * 10/2004 | Johnson | 296/50 |

* cited by examiner

Primary Examiner—H. Gutman

(57) ABSTRACT

An equipment lifting and transporting device that replaces a conventional tail gate on a dump truck. FIGS. 8 and 9 illustrate the operation of the device. Lift gate 24 is pivotally attached to the rear of dump bed 12 by pin 38. When the dump bed is raised, as in FIG. 8, the lower portion of the transporter rests on the ground. Equipment can then be rolled or pushed onto the transporter. The dump bed is then lowered to its resting position, as shown in FIG. 9. The transporter is thereby raised clear of the ground, lifting the equipment with it. A standoff located on the lower portion of the transporter bears against the frame of the vehicle, or other suitably stable point. The equipment is thereby secured to the rear of the vehicle so that it can be transported to another location.

13 Claims, 11 Drawing Sheets

INTEGRATED TAIL GATE TRANSPORTER

BACKGROUND OF THE INVENTION

1. Field of the Invention

This invention relates to the field of transportation. More specifically, the invention comprises a transporting platoform which can be substituted for the tail gate of a dump truck in order to lift and carry items to be transported.

2. Description of the Related Art

The present invention is suitable for use with a wide variety of vehicles having a tilting cargo bed. FIG. 1 shows one such vehicle, denoted as utility vehicle 10. Utility vehicle 10 is fairly small, but serves to illustrate the relevant features. It includes dump bed 12, which can be raised to empty its contents pas tail gate 14. Tail gate 14 is typically hinged at its upper end, so that the lower portion can pivot open to release the bed's contents.

FIG. 2 shows dump bed 12 in a raised position. Tail gate 14 pivots about two pivot joints 16. It is customarily secured at its lower end until the operator is ready to dump the bed. At this point the lower end is released and the tail gate pivots open as the dump bed is raised. These features are common to many dump trucks of many sizes, as will be understood by those skilled in the art.

Many such tail gates are made removable, since the utility vehicle may be used for purposes other than carrying and dumping bulk material. FIG. 3 shows a detailed view of one type of pivot joint 16. Tailgate 14 features a pin 18 on either side of the tailgate's upper extreme. Toggle latch 22 is attached to the outside of dump bed 12. When the tail gate is in position, slot 46 of draw bar 48 is slipped over pin 18. The toggle latch is then toggled to a locked position. Pin 18 is thereby drawn into a pivot journal on the back of the dump bed. This feature allows the tail gate to pivot with respect to the dump bed, as described previously.

If the user wishes to remove the tail gate altogether, he or she releases toggle latch 22 and pivots draw bar 48 away from pin 18 (This must be done on both sides). The tail gate can then be removed from the vehicle.

The mechanisms shown are one version among many in common use. Large dump trucks often use a pivot joint which is bolted more permanently in place. Such a joint looks different, but the pivoting of the tail gate with respect to the dump bed is essentially the same.

BRIEF SUMMARY OF THE INVENTION

The present invention comprises an equipment lifting and transporting device that replaces a conventional tail gate. FIGS. 8 and 9 illustrate the operation of the device. Lift gate 24 is pivotally attached to the rear of dump bed 12 by pin 38. When the dump bed is raised, as in FIG. 8, the lower portion of the transporter rests on the ground. Equipment can then be rolled or pushed onto the transporter. The dump bed is then lowered to its resting position, as shown in FIG. 9. The transporter is thereby raised clear of the ground, lifting the equipment with it.

A standoff located on the lower portion of the transporter bears against the frame of the vehicle, or other suitably stable point. The equipment is thereby secured to the rear of the vehicle so that it can be transported to another location. The equipment is unloaded by reversing the procedure just described. A stop gate on the rear of the transporter can be raised and locked into position in order to further secure the equipment being transported.

REFERENCE NUMERALS IN THE DRAWINGS

| 10 | utility vehicle | 12 | dump bed |
|---|---|---|---|
| 14 | tail gate | 16 | pivot joint |
| 18 | pin | 22 | toggle latch |
| 24 | lift gate | 26 | deck |
| 28 | lower frame | 30 | stop gate |
| 32 | gate latch | 34 | pivot |
| 36 | stand off | 38 | pin |
| 40 | top link | 42 | upright |
| 44 | brace | 46 | slot |
| 48 | draw bar | 50 | walking mower |
| 52 | frame | 54 | receiver |
| 56 | adjustable stand off | 58 | adjustment pin |
| 60 | adjustment hole | 62 | integrated gate/transporter |
| 64 | gate panel | | |

DETAILED DESCRIPTION OF THE INVENTION

Figure 4:
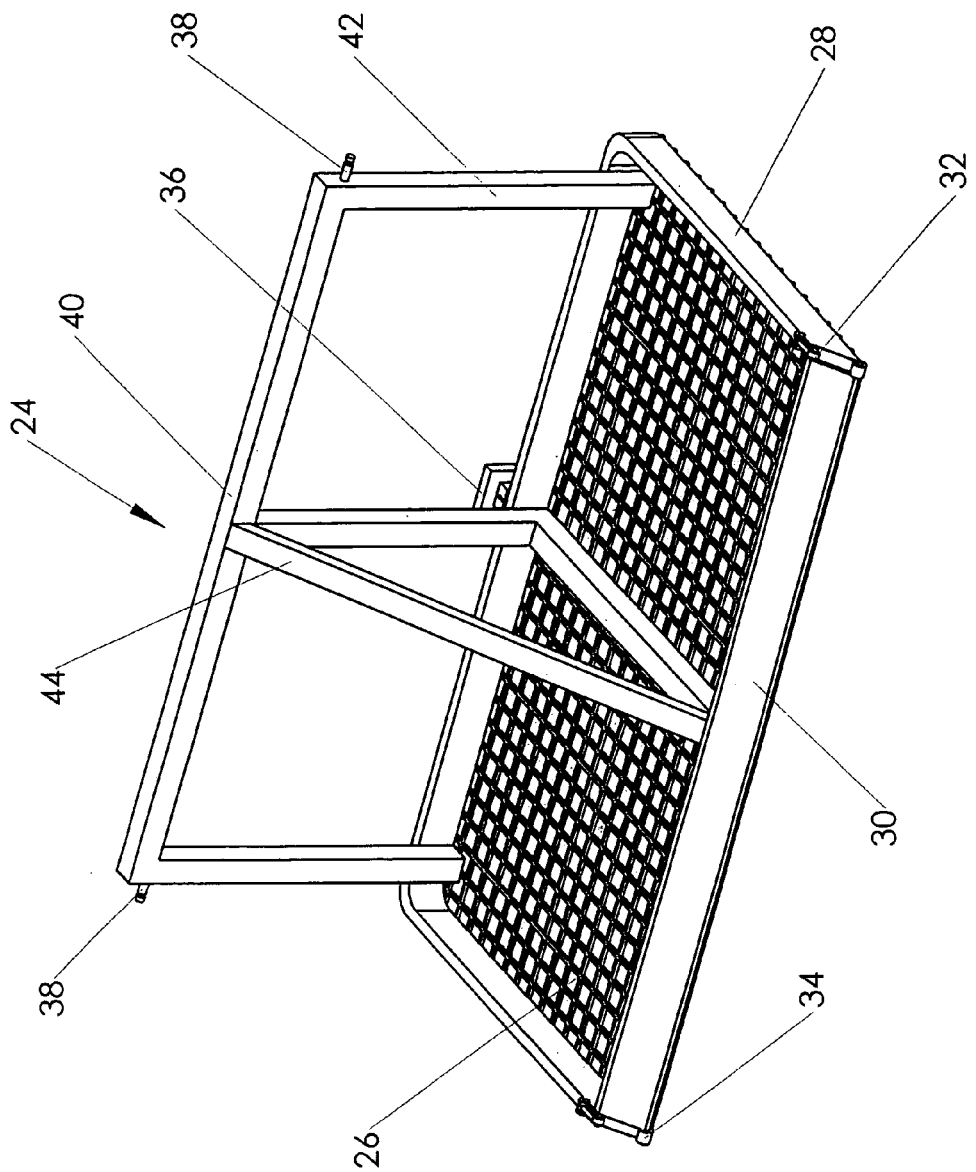
FIG. 4 is a perspective view, showing the present invention.

FIG. 4 shows the present invention, designated as lift gate 24. Lift gate 24 comprises a solid lower frame 28 with a deck 26. Lower frame 28 is connected to top link 40 by three uprights 42. Brace 44 attaches to deck 26 in such a way as to create two equally sized compartments on lift gate 24. Brace 44 also reinforces the structure of deck 26 when a load is placed on the lift gate.

Stop gate 30 is attached to lower frame 28 by pivot 34. This feature allows stop gate 30 to rotate about the axis of pivot 34. The stop gate is shown in the "up" position, where it stops objects being transported from rolling off the back of deck 26. Stop gate 30 can be lowered to the "down" position to facilitate loading by releasing gate latch 32.

A pin 38 is located on both sides of top link 40 to facilitate connection to utility vehicle 10. Lift gate 24 also employs standoff 36 on the forward portion of lower frame 28. This standoff is positioned to bear against the frame of the utility vehicle when the dump bed is in the lowered position.

Figure 5:
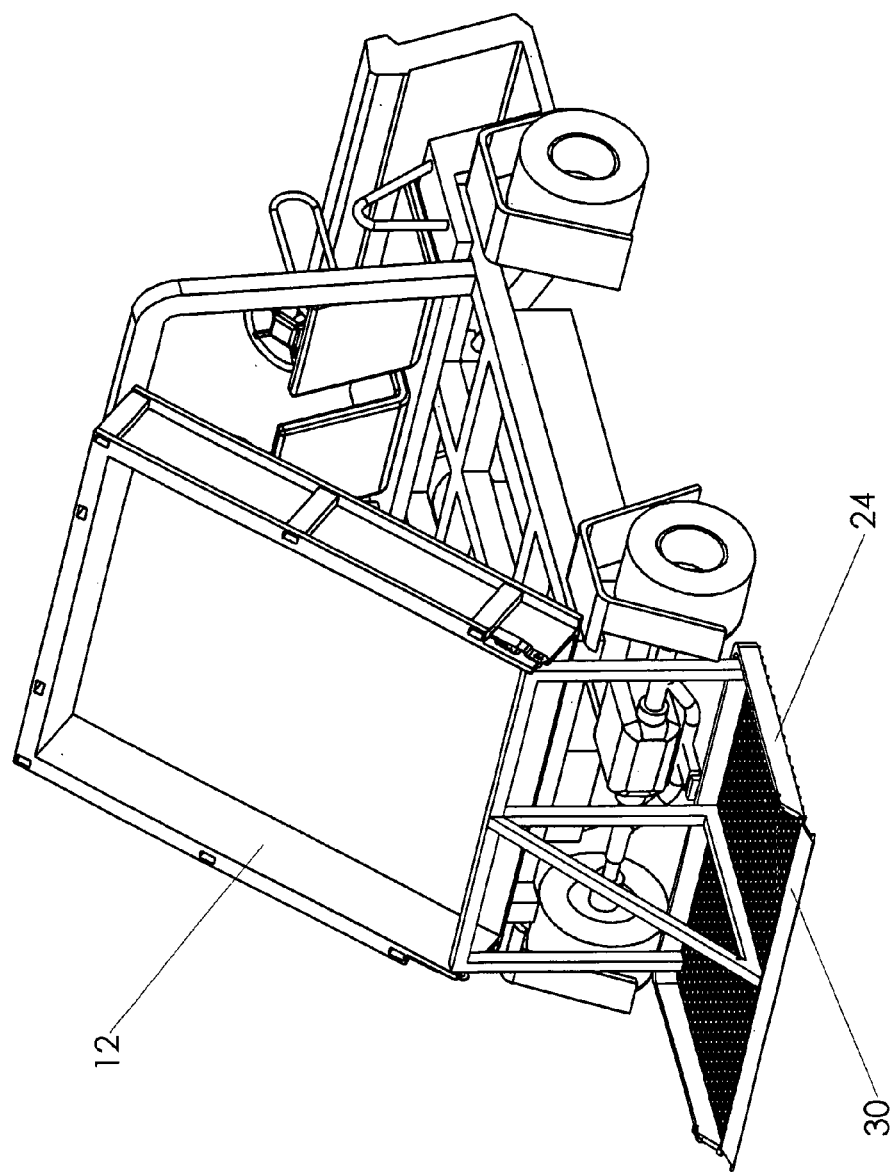
FIG. 5 is a perspective view, showing the present invention mounted on a prior art utility vehicle.

FIG. 5 shows the invention mounted to a utility vehicle. Lift gate 24 is pivotally attached to dump bed 12 of a utility vehicle. Dump bed 12 is pictured in the raised position to illustrate how lift gate 24 can be lowered to the ground to facilitate loading. Lift gate 24 is pictured with stop gate 30 in the lowered position so that objects like lawn mowers can easily be rolled onto the deck.

Figure 1:
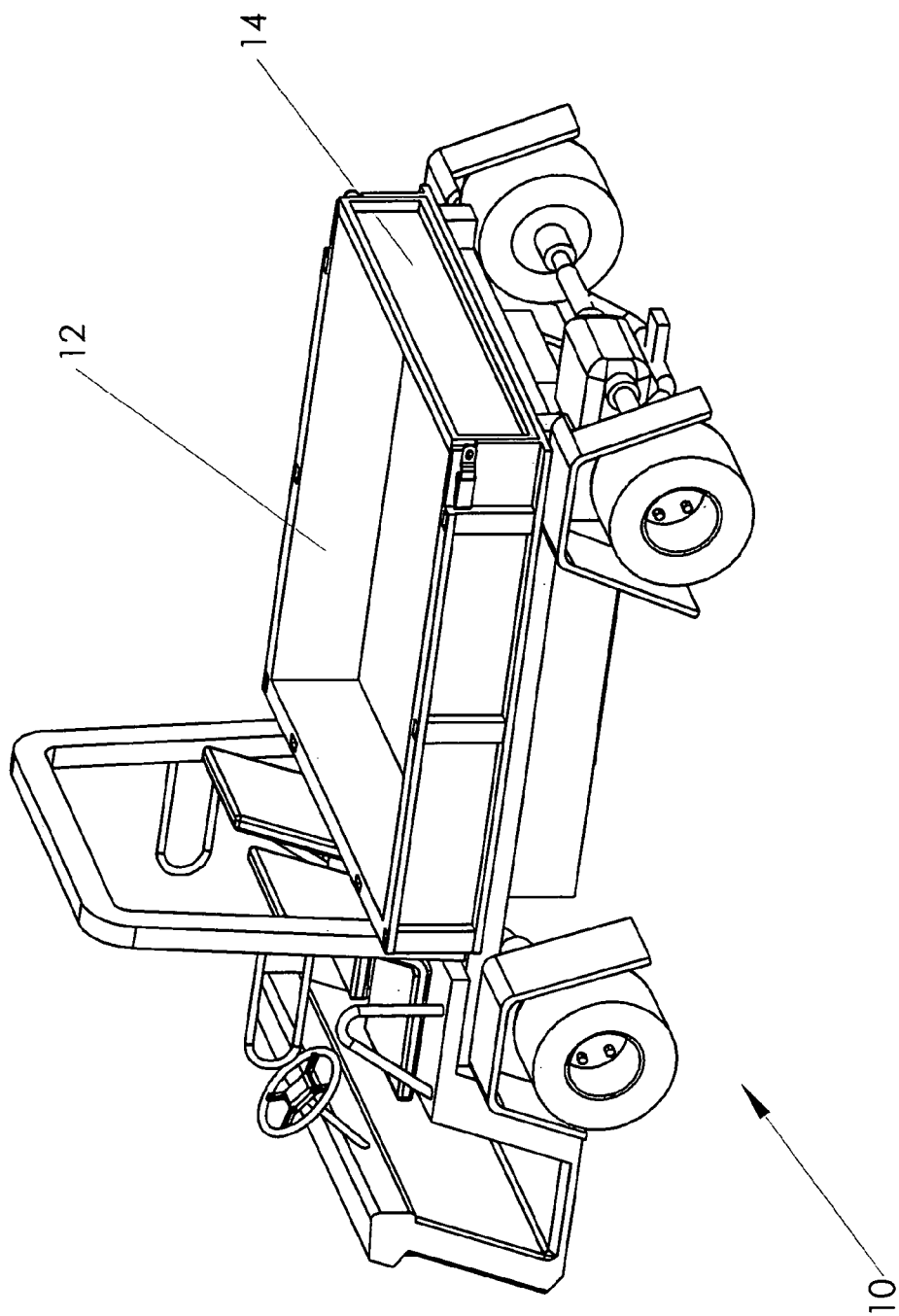
FIG. 1 is a perspective view, showing a prior art utility vehicle.
Figure 2:
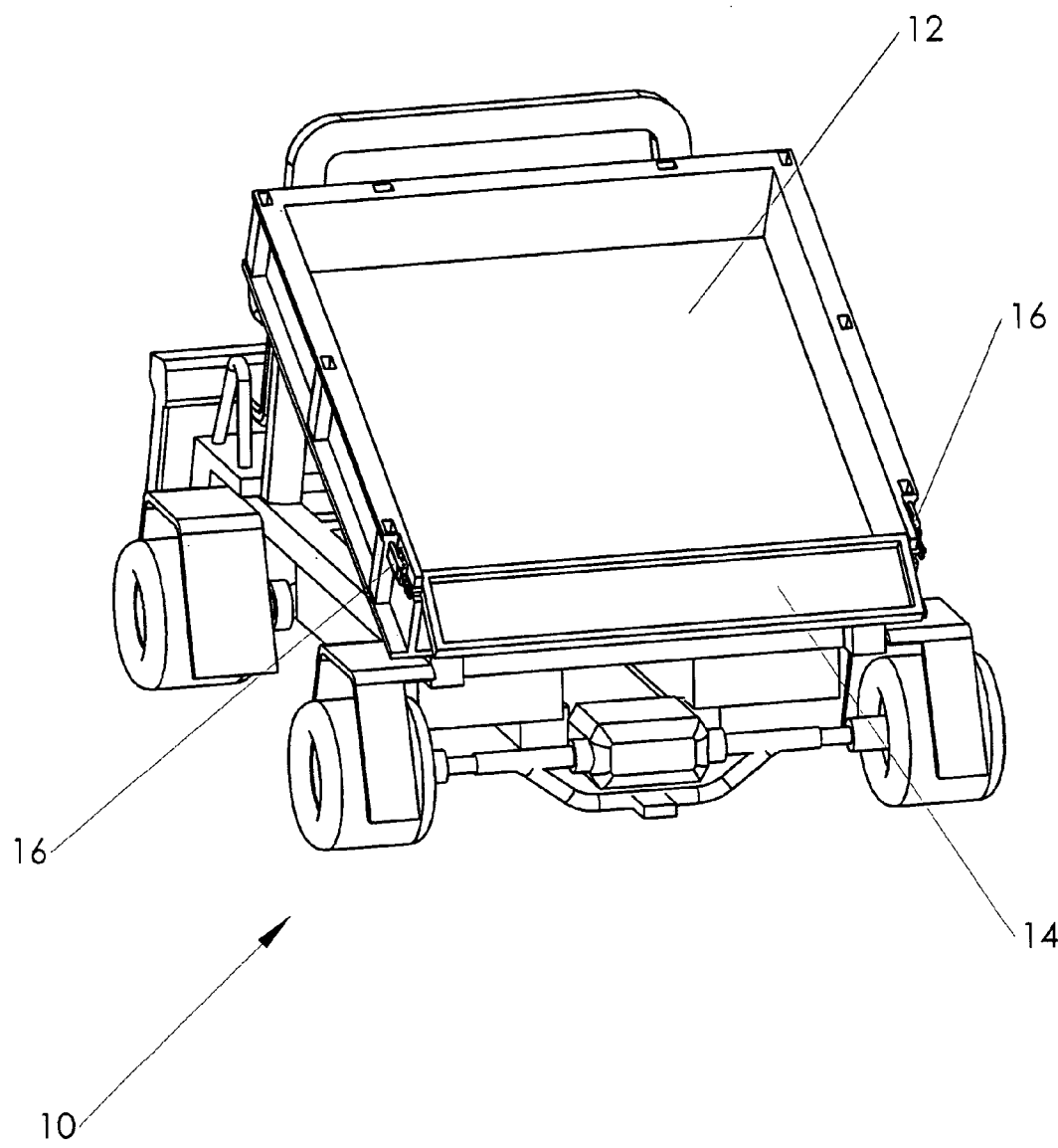
FIG. 2 is a perspective view, showing the vehicle of FIG. 1 with its dump bed in a raised position.
Figure 3:
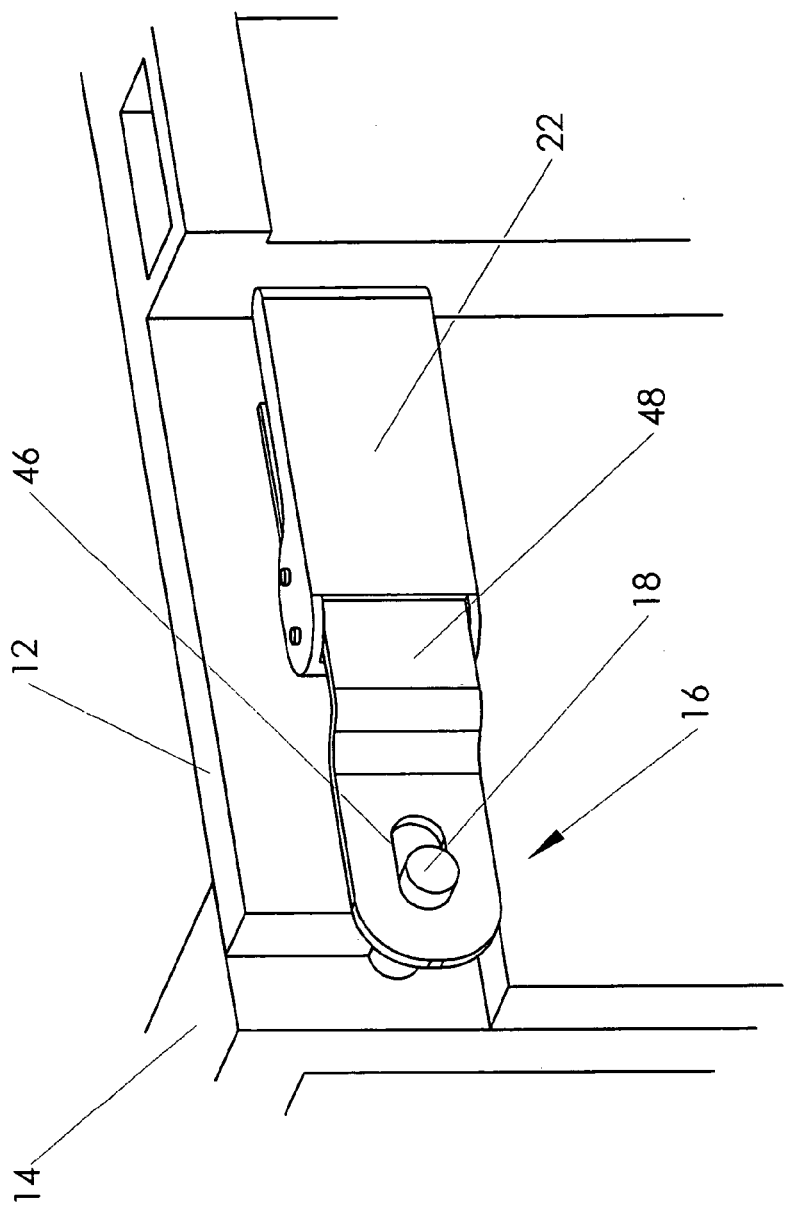
FIG. 3 is a detail view, showing the pivot joint used to pivot the tail gate with respect to the dump bed.
Figure 6:
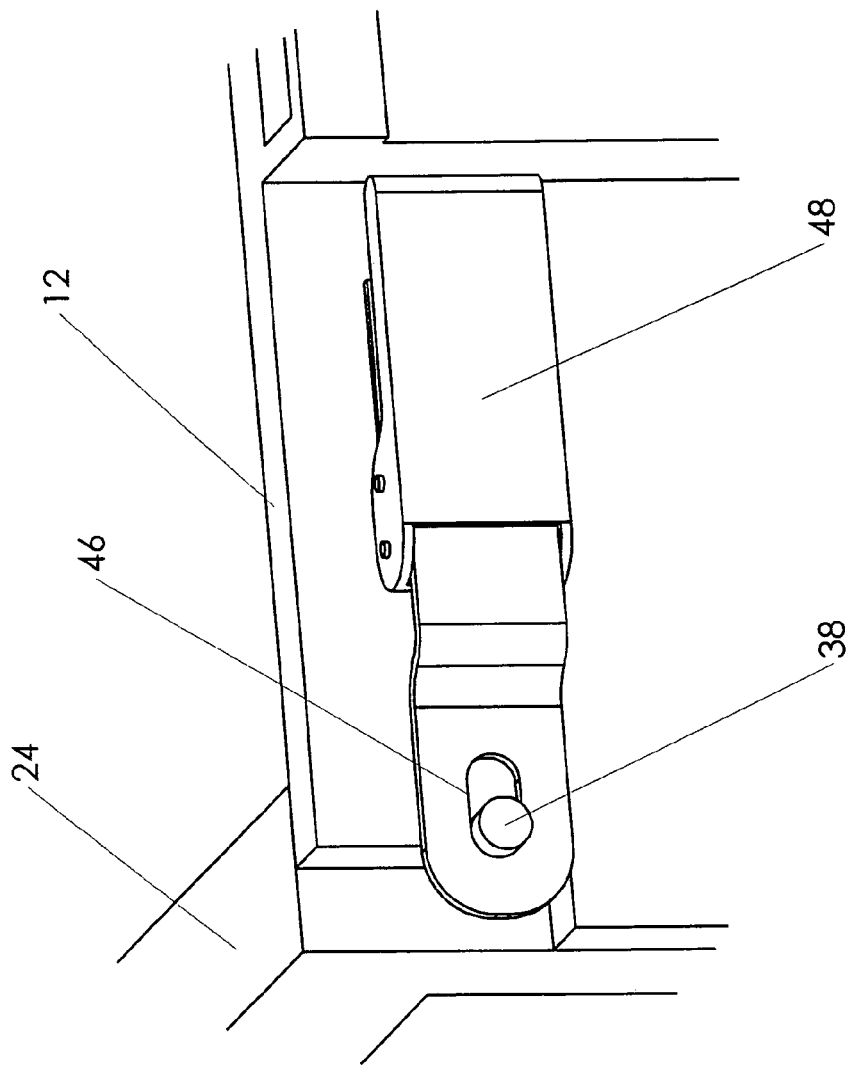
FIG. 6 is a detail view, showing the pivot joint used to mount the present invention.

FIG. 6 shows the toggle latching device described previously with respect to FIG. 3. Lift gate 24 has been substituted for the prior art tailgate. The reader will observe that the toggle latch engages pin 38 and pivotally connects the lift gate to the dump bed in the same way the prior art tail gate is attached. Thus, one can install the lift gate by removing the prior art tail gate and substituting the lift gate in its place.

Figure 7:
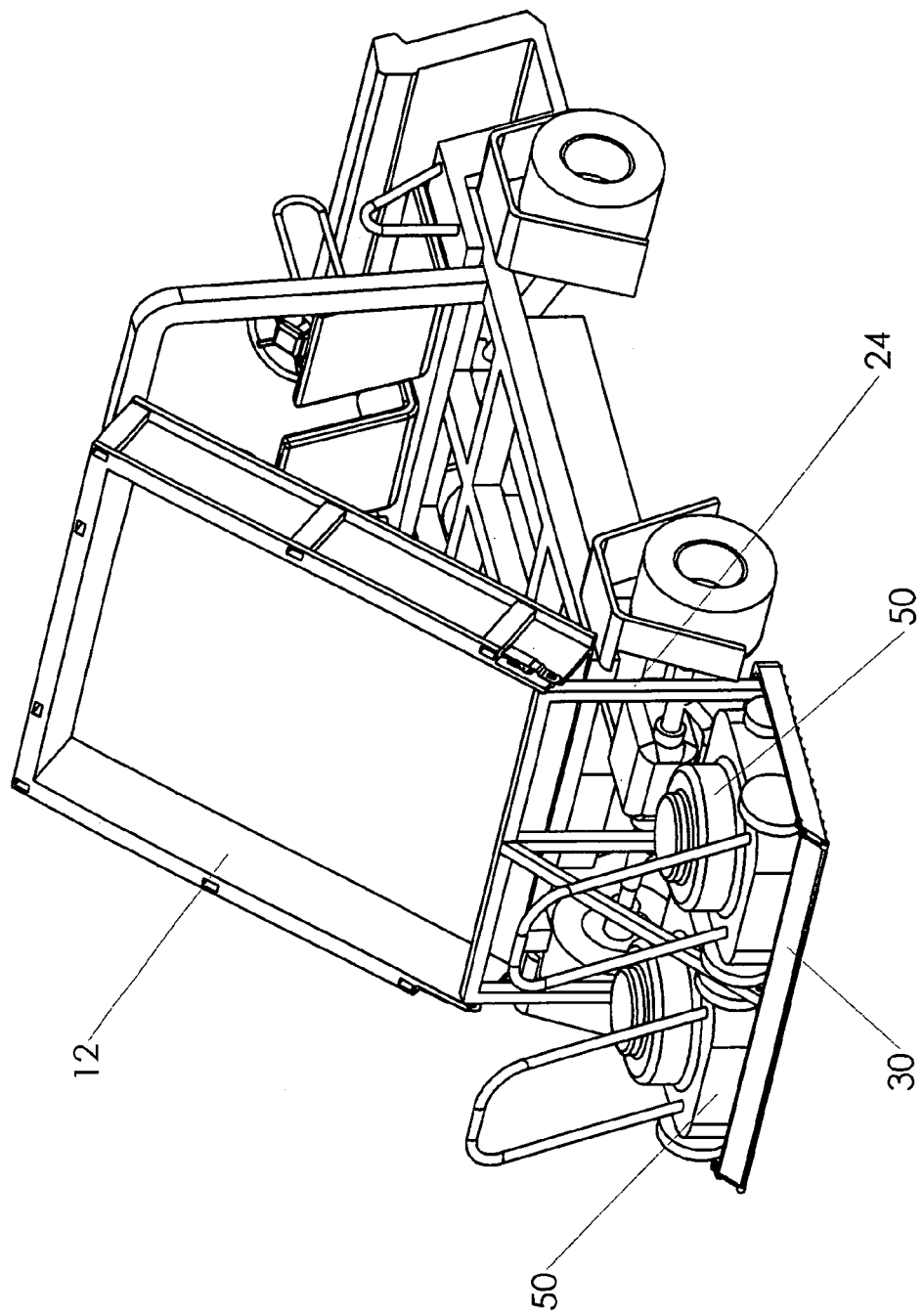
FIG. 7 is a perspective view, showing the loading of equipment on the transporter.

FIG. 7 shows how equipment can be loaded onto the invention. Dump bed 12 is pictured in the raised position so that lift gate 24 is on or near the ground. Stop gate 30 is placed in the lowered position so that two walking mowers 50 can be rolled onto lift gate 24. Stop gate 30 is then raised and locked in the upward position (as shown) to prevent walking mowers 50 from rolling off of the gate during transport.

Figure 8:
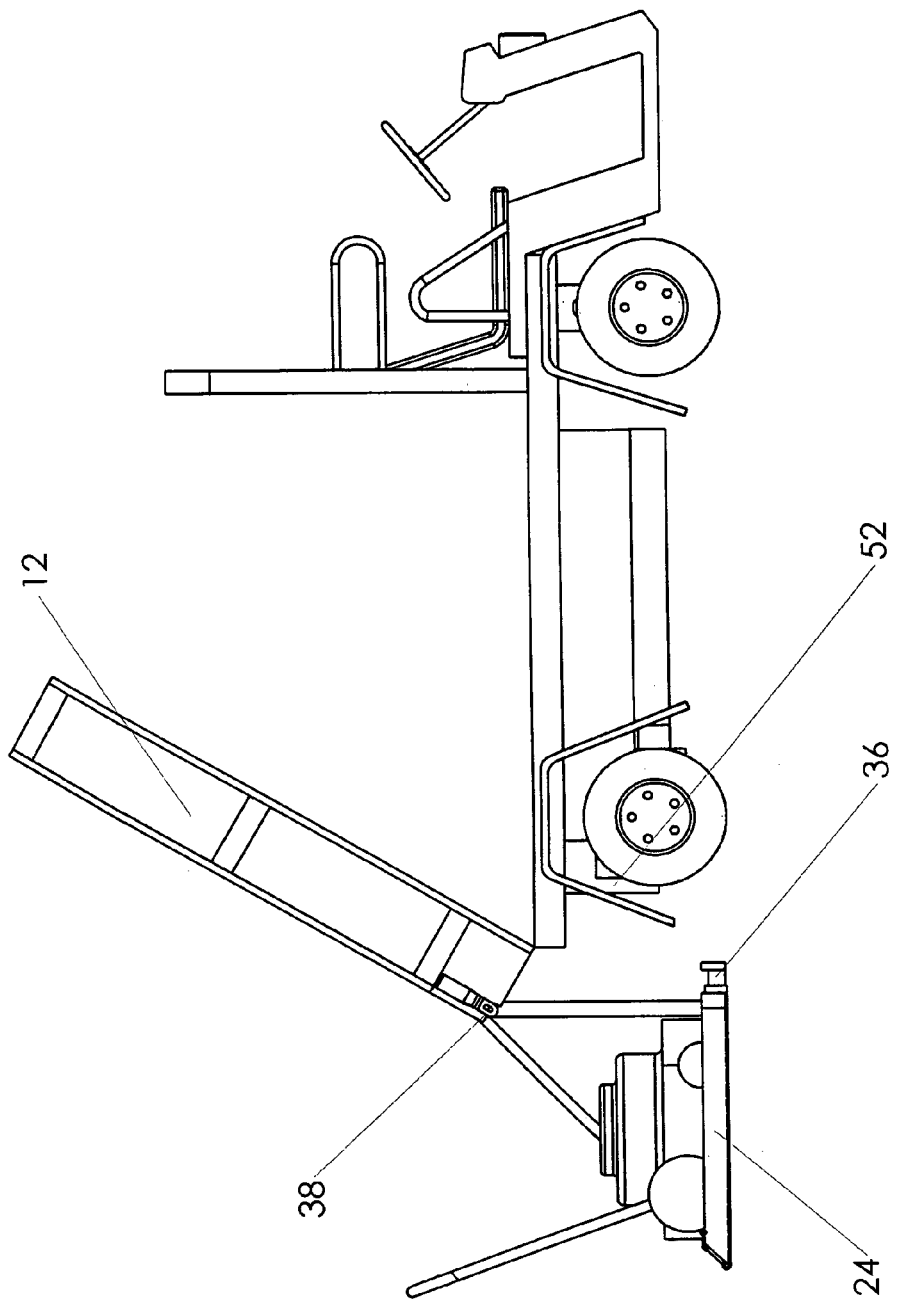
FIG. 8 is an elevation view, showing the loading of equipment on the transporter.
Figure 9:
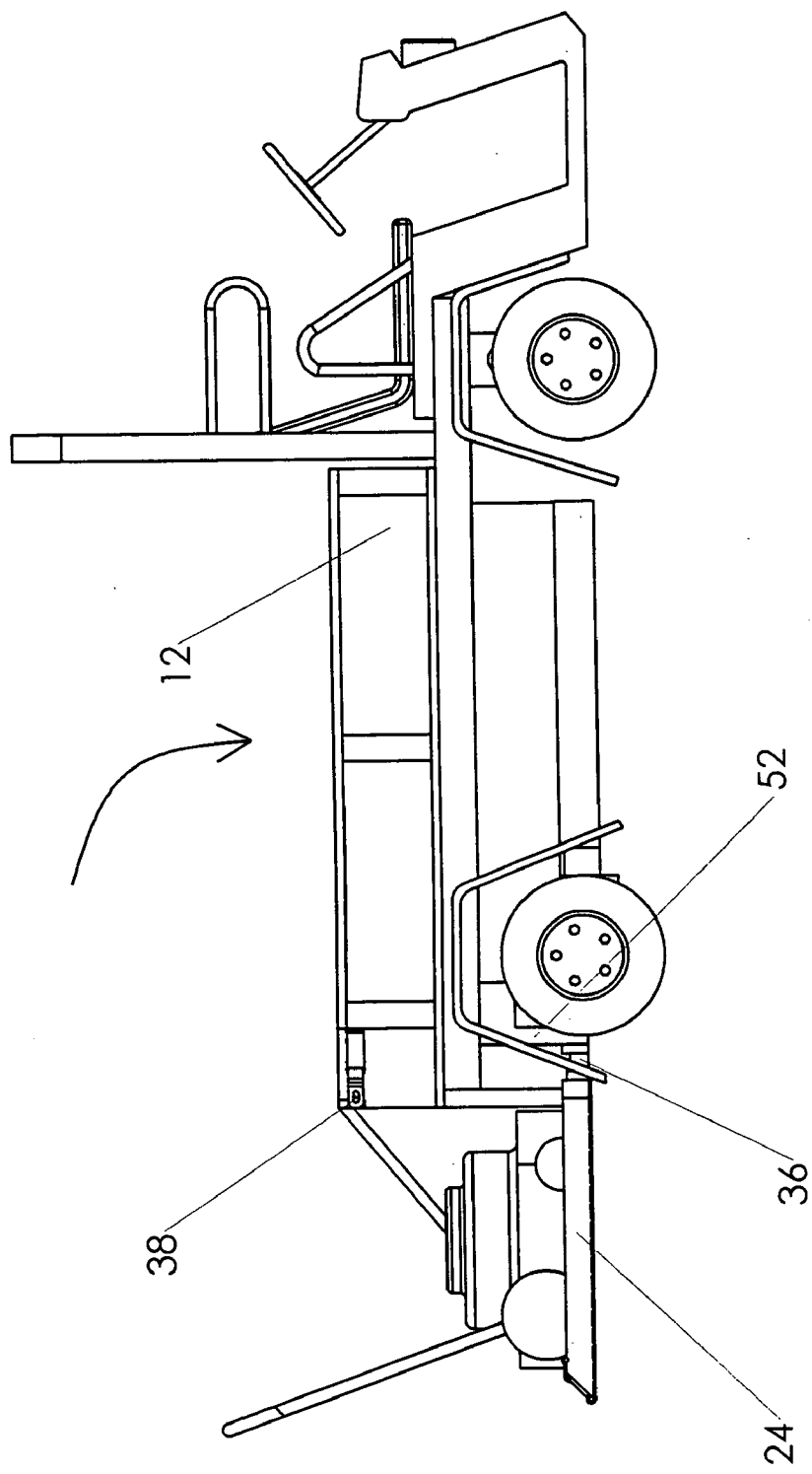
FIG. 9 is an elevation view, showing the raising of the transporter.

FIG. 8 and FIG. 9 show elevation views of the loading process. FIG. 8 shows the invention with the dump bed in the raised position, so that the lift gate is ready for for loading or unloading. When dump bed 12 is raised, lift gate 24 pivots about pin 38 with respect to dump bed 12 so that lift gate 24 is always in a position close to the ground. The downward movement of the rear of dump bed 12 as the bed is raised lowers lift gate 24 to the ground for loading or unloading.

FIG. 9 shows the invention in the raised position for transporting. When dump bed 12 is lowered, lift gate 24 pivots about pin 38 with respect to dump bed 12. The upward movement of the rear of dump bed 12 raises lift gate 24 off the ground. When dump bed 12 is in the lowered position, standoff 36 of lift gate 24 bears against frame 52 of the utility vehicle. The lift gate and its cargo are thereby stabilized against the rear of the utility vehicle.

Figure 10:
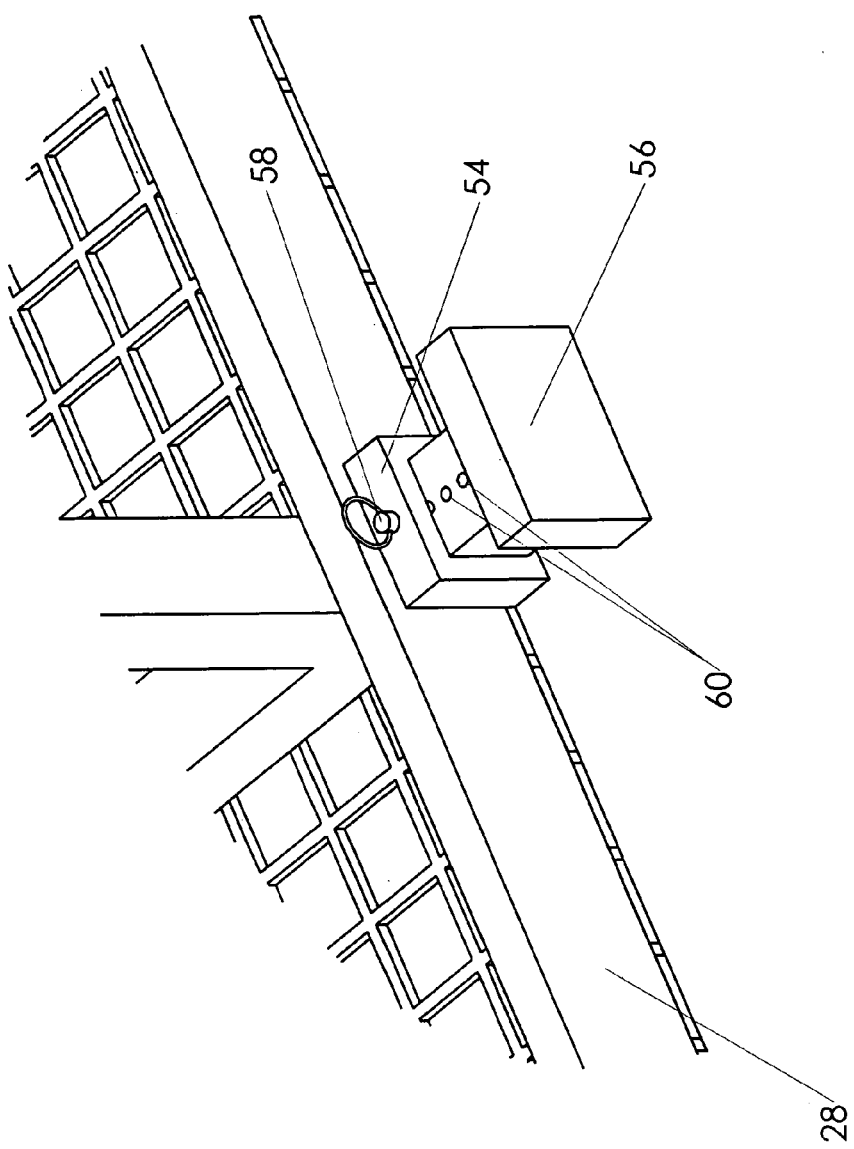
FIG. 10 is a detail view, showing an adjustable standoff

FIG. 10 illustrates the invention with an adjustable standoff. Adjustable standoff 56 can be used to lengthen or shorten the distance between lower frame 28 and the frame of the utility vehicle (thereby altering the angle of the lift gate with respect to the dump bed when the dump bed is in the lowered position). Receiver 54 is located on lower frame 28 on the side facing the utility vehicle. Adjustable standoff 56 is sized to insert into receiver 54. Adjustable standoff 56 has a series of adjustment holes 60 which enable the user to set the desired standoff distance. Adjustment pin 58 is inserted through receiver 54 into adjustment hole 60 when adjustable standoff 56 is set to the desired distance.

Figure 11:
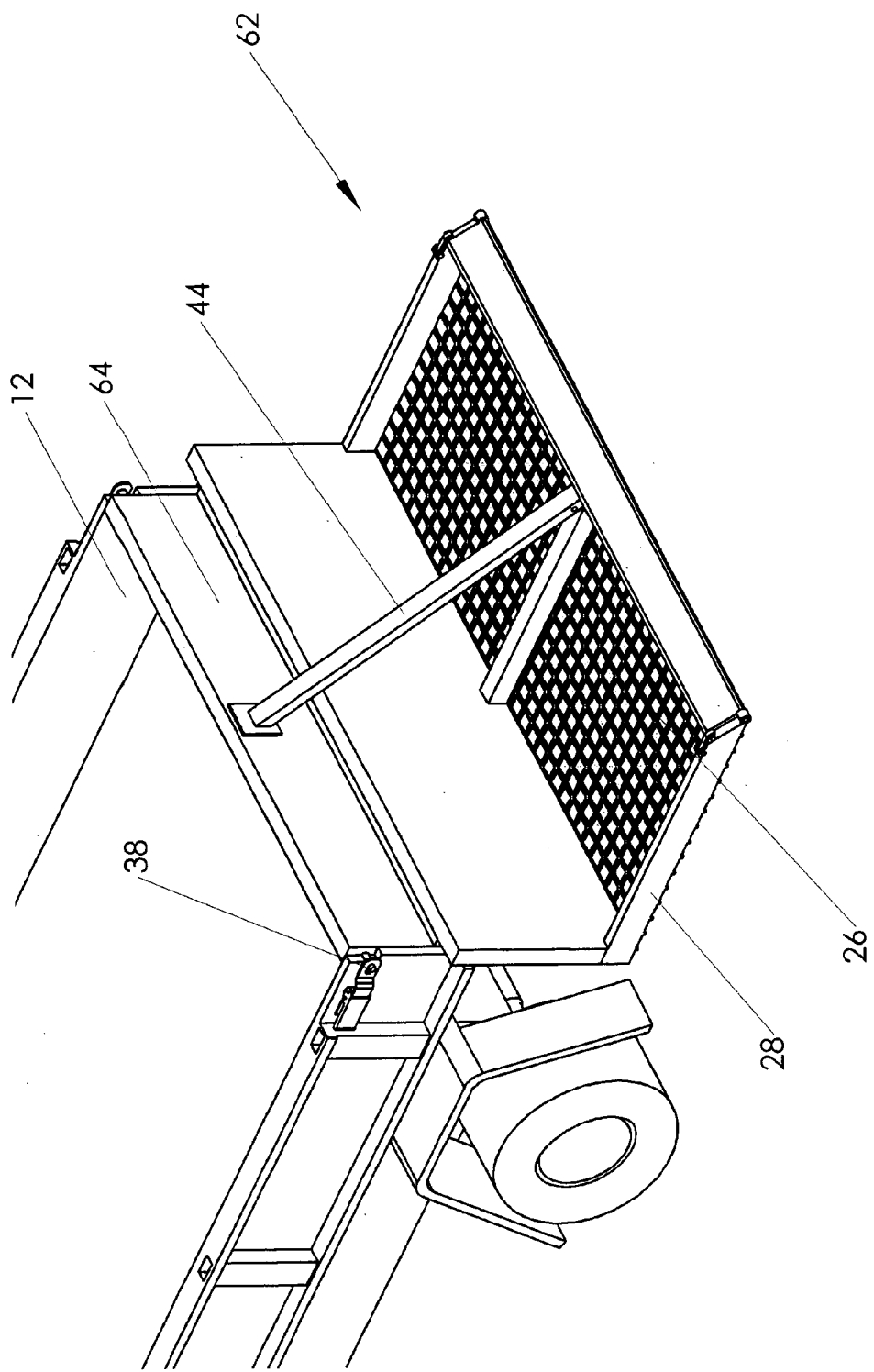
FIG. 11 is a perspective view, showing an alternate embodiment of the transporter which can function as both a transporter and a tail gate.

FIG. 11 illustrates an alternative embodiment of the invention which can function both as a tail gate and a transporter. Integrated gate/transporter 62 pivotally connects to dump bed 12. Two pins 38 are used to create this connection, as for the preferred embodiment lift gate 24. Integrated gate/transporter 62 has a solid gate panel 64 that enables bulk materials to be transported in the back of dump bed 12 when the bed is in the lowered position (without spilling out). Integrated gate/transporter 62 also functions like lift gate 24 to load and transport objects. Brace 44 and lower frame 28 transmit the load of deck 26 to gate panel 64.

The preceding description contains significant detail regarding the novel aspects of the present invention. It is should not be construed, however, as limiting the scope of the invention but rather as providing illustrations of the preferred embodiments of the invention. As an example, brace 44 does not have to be centered on lift gate 24. A variety of means could be used to transmit the load of deck 26 and objects being transported on it. Thus, the scope of the invention should be fixed by the following claims, rather than by the examples given.

Having described my invention, I claim:

1. A lift gate for lifting an object off the ground and transporting said object with a vehicle, wherein said vehicle includes,
    i. a frame,
    ii. a dump bed having a front portion and a rear portion,
    iii. a dump bed opening across said rear portion of said dump bed,
    iii. wherein said dump bed is pivotally attached to said frame,
    iv. dump bed pivoting means whereby said dump bed can be moved from a resting position where said dump bed lies upon said frame to a raised position where said dump bed is pivoted upward with respect to said frame, and
    v. a pivot joint located on said dump bed proximate said rear portion of said dump bed, comprising:
        a. an upright, having a top portion and a bottom portion;
        b. pivot joint attachment means located proximate said top portion of said upright, and configured to pivotally connect to said pivot joint on said dump bed so that said upright is pivotally connected to said dump bed;
        c. a deck, connected to said bottom portion of said upright and extending rearward from said upright with respect to said vehicle; and
        d. wherein said upright and said deck are sized and oriented so that when said dump bed is in said raised position, said deck will be positioned proximate said ground, and when said dump bed is lowered to said resting position said deck will be lifted off said ground.

2. A lift gate as recited in claim 1, further comprising a standoff positioned to bear against said vehicle frame when said dump bed is in said resting position.

3. A lift gate as recited in claim 2, wherein said standoff can be adjusted in the forward and rearward direction with respect to said lift gate.

4. A lift gate as recited in claim 3, further comprising:
    a. wherein said deck includes a front side proximate said upright, a rear side distal to said upright, a left side, and a right side;
    b. a raised barrier located on said left side, said front side, and said right side of said deck;
    c. a stop gate, pivotally attached to said deck across said rear side of said deck so that said stop gate can be moved between an open position, wherein said object can be pushed onto said deck over said stop gate, and a closed position wherein said object will be secured on said deck; and
    d. a stop gate latch for securing said stop gate in said closed position.

5. A lift gate as recited in claim 3, wherein said upright includes a gate panel configured to close said dump bed opening when said dump bed is in said resting position.

6. A lift gate as recited in claim 2, further comprising:
    a. wherein said deck includes a front side proximate said upright, a rear side distal to said upright, a left side, and a right side;
    b. a raised barrier located on said left side, said front side, and said right side of said deck;
    c. a stop gate, pivotally attached to said deck across said rear side of said deck so that said stop gate can be moved between an open position, wherein said object can be pushed onto said deck over said stop gate, and a closed position wherein said object will be secured on said deck; and d. a stop gate latch for securing said stop gate in said closed position.

7. A lift gate as recited in claim 2, wherein said upright includes a gate panel configured to close said dump bed opening when said dump bed is in said resting position.

8. A lift gate as recited in claim 2, further comprising a brace extending from proximate said upper portion of said upright to said deck.

9. A lift gate as recited in claim 1, further comprising:
a. wherein said deck includes a front side proximate said upright, a rear side distal to said upright, a left side, and a right side;
b. a raised barrier located on said left side, said front side, and said right side of said deck;
c. a stop gate, pivotally attached to said deck across said rear side of said deck so that said stop gate can be moved between an open position, wherein said object can be pushed onto said deck over said stop gate, and a closed position wherein said object will be secured on said deck; and
d. a stop gate latch for securing said stop gate in said closed position.

10. A lift gate as recited in claim 9, wherein said upright includes a gate panel configured to close said dump bed opening when said dump bed is in said resting position.

11. A lift gate as recited in claim 1, wherein said upright includes a gate panel configured to close said dump bed opening when said dump bed is in said resting position.

12. A lift gate as recited in claim 11, further comprising a brace extending from proximate said upper portion of said upright to said deck.

13. A lift gate as recited in claim 1, further comprising a brace extending from proximate said upper portion of said upright to said deck.

* * * * *